US 8,599,158 B2

(12) United States Patent
Punke et al.

(10) Patent No.: US 8,599,158 B2
(45) Date of Patent: Dec. 3, 2013

(54) MULTI-SURFACE TOUCH SENSITIVE APPARATUS AND METHOD

(75) Inventors: Martin Punke, Mittelbiberach (DE); Ilkka Juhani Niemela, Nokia (FI); Thomas Franke, Laupheim (DE)

(73) Assignee: Nokia Corporation, Espoo (FI)

( * ) Notice: Subject to any disclaimer, the term of this patent is extended or adjusted under 35 U.S.C. 154(b) by 192 days.

(21) Appl. No.: 13/172,000

(22) Filed: Jun. 29, 2011

(65) Prior Publication Data
US 2013/0002566 A1    Jan. 3, 2013

(51) Int. Cl.
*G06F 3/041*    (2006.01)

(52) U.S. Cl.
USPC ........................................ 345/173

(58) Field of Classification Search
USPC ........ 345/156, 173–176; 178/18.01; 977/742; 200/512, 514; 340/407.1
See application file for complete search history.

(56) References Cited

U.S. PATENT DOCUMENTS

| | | | |
|---|---|---|---|
| 2006/0197750 A1* | 9/2006 | Kerr et al. | 345/173 |
| 2008/0062147 A1* | 3/2008 | Hotelling et al. | 345/174 |
| 2009/0322709 A1* | 12/2009 | Lee et al. | 345/176 |
| 2010/0105442 A1* | 4/2010 | Yoo | 455/566 |
| 2010/0184485 A1 | 7/2010 | Kim | |
| 2010/0194697 A1* | 8/2010 | Hotelling et al. | 345/173 |
| 2010/0214232 A1* | 8/2010 | Chan et al. | 345/173 |
| 2010/0295799 A1* | 11/2010 | Nicholson et al. | 345/173 |
| 2011/0175828 A1* | 7/2011 | Liu et al. | 345/173 |
| 2011/0187672 A1* | 8/2011 | Hung et al. | 345/174 |
| 2011/0304582 A1* | 12/2011 | Ho et al. | 345/174 |
| 2012/0088553 A1* | 4/2012 | Nunes | 455/566 |
| 2012/0120004 A1* | 5/2012 | Chang et al. | 345/173 |

FOREIGN PATENT DOCUMENTS

EP    0881617 A1    12/1998

* cited by examiner

*Primary Examiner* — Joe H Cheng
(74) *Attorney, Agent, or Firm* — Harrington & Smith

(57) ABSTRACT

In accordance with an example embodiment of the present invention, an apparatus comprises a first side, second side and touch sensitive layer, the touch sensitive layer coupled with the apparatus and comprising a wiring pattern for receiving a touch signal, the touch sensitive layer having a first portion opposing the first side and a second portion opposing the second side.

20 Claims, 6 Drawing Sheets

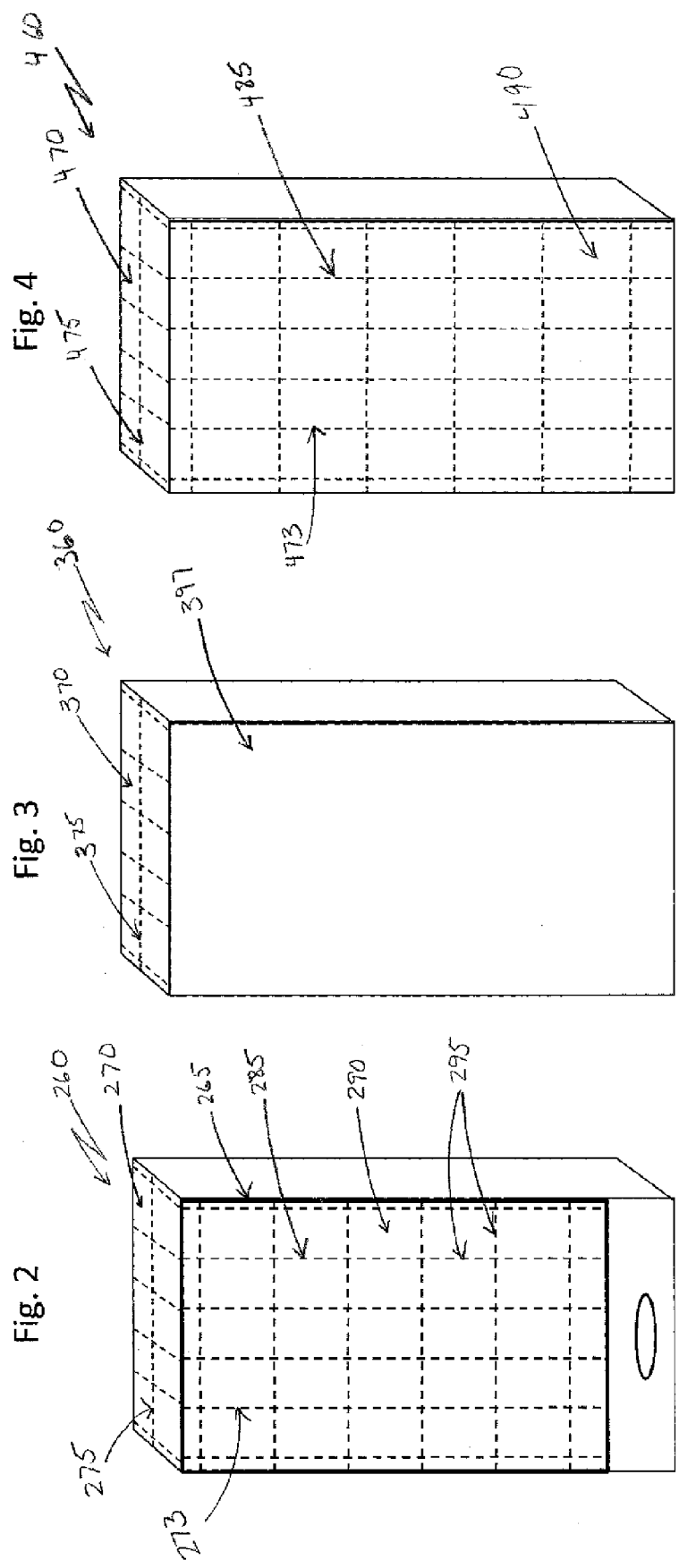

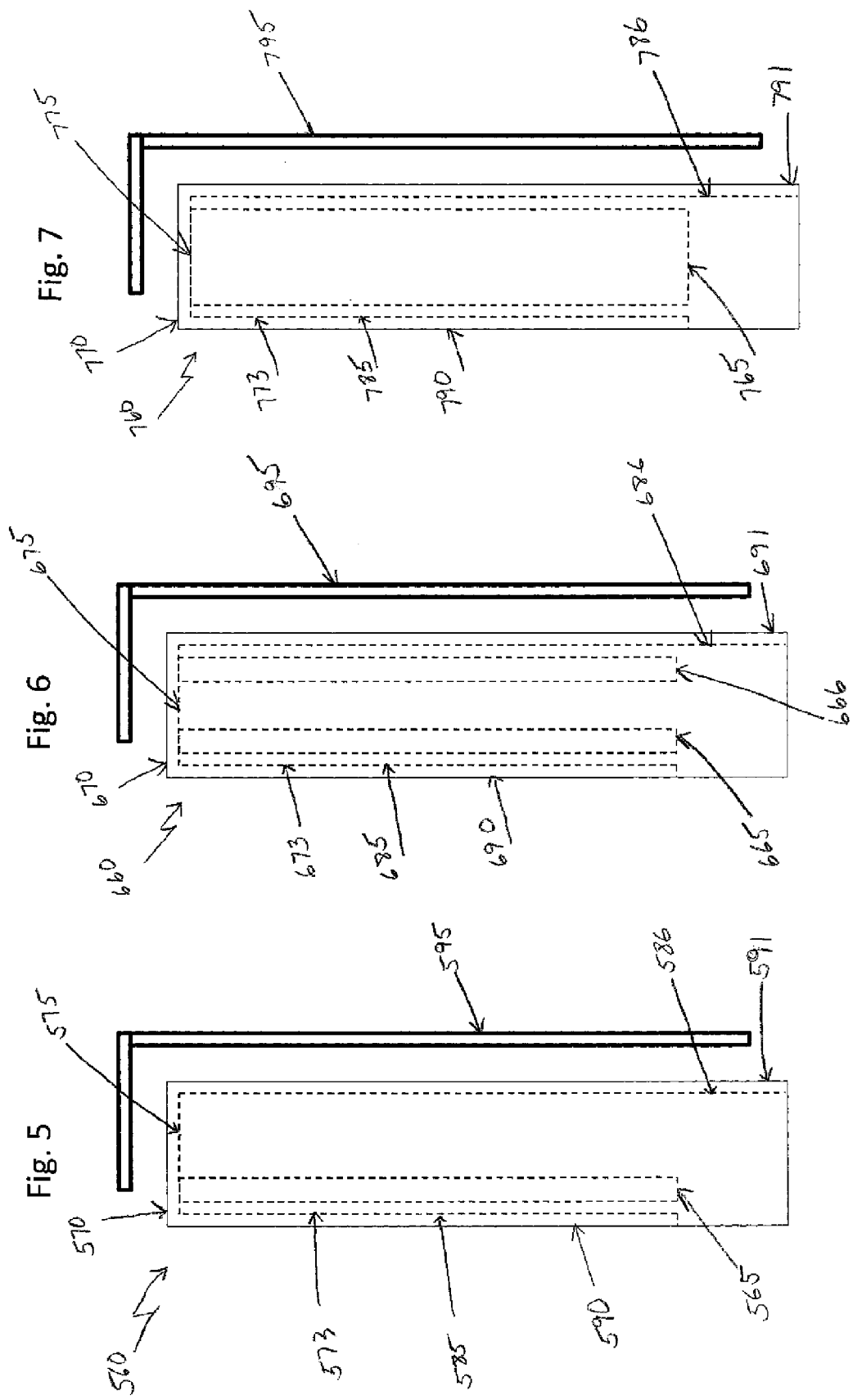

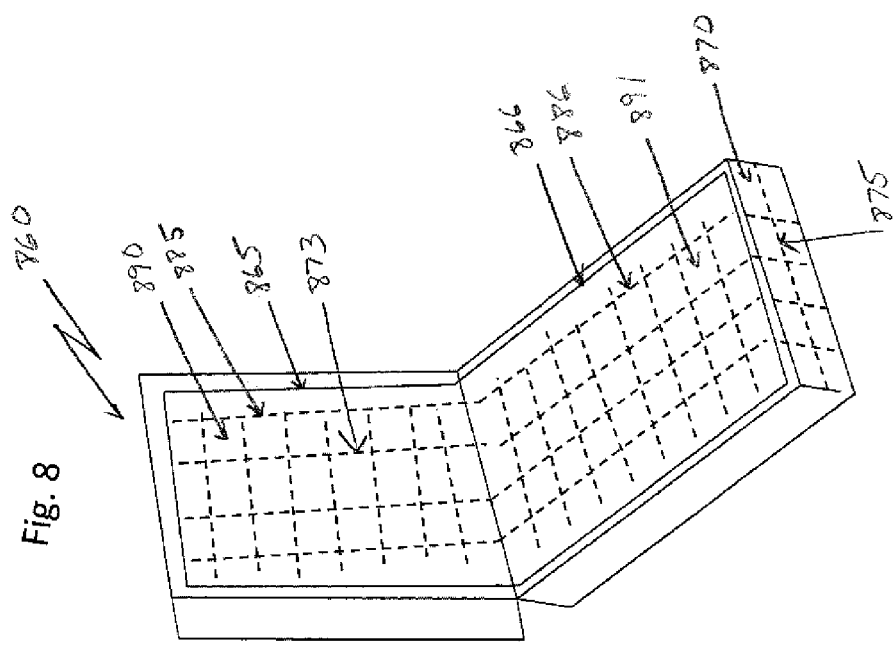

MULTI-SURFACE TOUCH SENSITIVE APPARATUS AND METHOD

TECHNICAL FIELD

The present application relates generally to a multi-surface touch sensitive apparatus.

BACKGROUND

A touch panel, generally, is an electronic sensing device for detecting the presence and location of a touch signal. The term may generally refer to touching the touch panel with a finger, hand or stylus. Touch panels are common in devices such as mobile phones, tablet computers and other electronic devices.

A touch screen generally refers to a touch panel combined with an electronic visual display. A touch screen enables a user to interact directly with what is displayed rather than indirectly with a cursor controlled by a mouse, for example.

SUMMARY

Various aspects of examples of the invention are set out in the claims.

According to a first aspect of the present invention, an apparatus comprises a first side, second side and touch sensitive layer, the touch sensitive layer is coupled with the apparatus and comprises a wiring pattern for receiving a touch signal, the touch sensitive layer having a first portion opposing said first side and a second portion opposing said second side.

According to a second aspect of the present invention, an apparatus comprises a first and second touch sensitive layer having at least one wiring pattern and first and second sides, the first touch sensitive layer coupled with said second touch sensitive layer, the second touch sensitive layer coupled with one device for driving said at least one wiring pattern, the first touch sensitive layer opposing the first side and the second touch sensitive layer opposing the second side.

According to a third aspect of the present invention, a method comprises coupling a touch sensitive layer of an apparatus with a driver, the apparatus having first and second sides, the touch sensitive layer having a first portion opposing the first side and a second portion opposing the second side.

BRIEF DESCRIPTION OF THE DRAWINGS

For a more complete understanding of example embodiments of the present invention, reference is now made to the following descriptions taken in connection with the accompanying drawings in which:

FIG. 2 is a perspective view of an apparatus comprising two sides, a touch sensitive layer and a display according to an example embodiment of the invention;

FIG. 3 is a perspective view of an apparatus comprising a side and touch sensitive layer according to an example embodiment of the invention;

FIG. 4 is a perspective view of an apparatus comprising two sides and a touch sensitive layer according to an example embodiment of the invention;

FIG. 5 is a side view of an apparatus comprising three sides, a touch sensitive layer and a display according to an example embodiment of the invention;

FIG. 6 is a side view of an apparatus comprising three sides, a touch sensitive layer and two displays according to an example embodiment of the invention;

FIG. 7 is a side view of an apparatus comprising three sides, a touch sensitive layer and transparent display according to an example embodiment of the invention;

FIG. 8 is a perspective view of an apparatus comprising three sides, a touch sensitive layer and two displays according to an example embodiment of the invention;

DETAILED DESCRIPTION OF THE DRAWINGS

An example embodiment of the present invention and its potential advantages are understood by referring to FIGS. 1 through 11 of the drawings.

Figure 1:
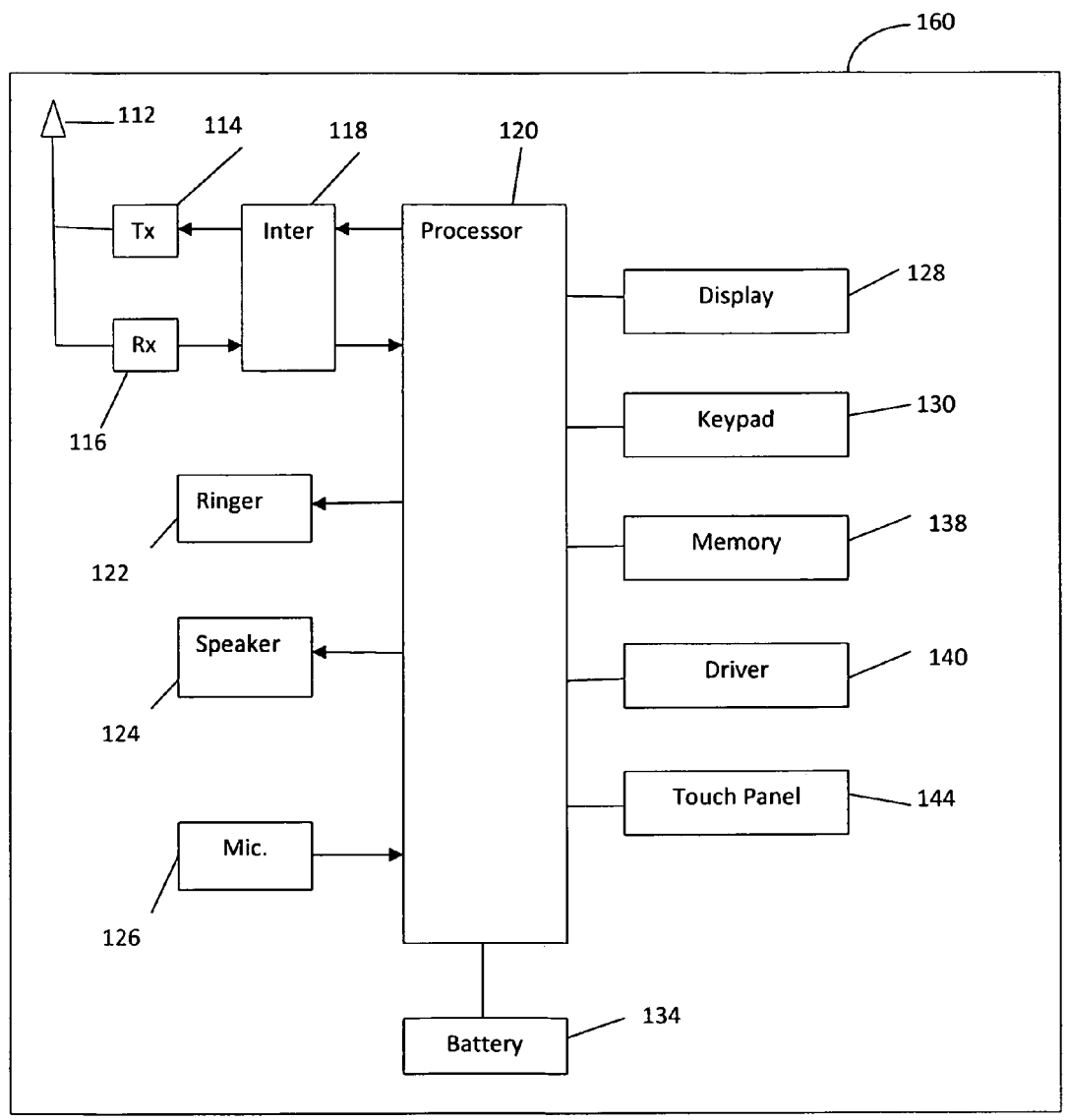
FIG. 1 is a block diagram of an apparatus according to an example embodiment of the invention.

FIG. 1 is a block diagram of an apparatus 160 according to an example embodiment of the invention. In an embodiment, an apparatus such as apparatus 160 comprises at least one antenna 112 in communication with a transmitter 114 and a receiver 116. Transmitter 114 and/or receiver 116 are connected with a network interface such as network interface 118 for transmitting and receiving signals. The apparatus 160 comprises a processor 120 and optionally one or more other processing components. The processor 120 provides at least one signal to the transmitter 114 and receives at least one signal from the receiver 116. In an embodiment, apparatus 160 further comprises a user interface that includes one or more input and/or output devices, such as a conventional earphone or speaker 124, a ringer 122, a microphone 126, at least one display 128, a keypad 130 and/or the like. Input and output devices of the user interface may be coupled with processor 120. In an embodiment, the at least one display 128 is at least one liquid crystal display and/or the like. Keypad 130 may be used to compose text communications and provide other user input to apparatus 160. In an embodiment, apparatus 160 further comprises at least one touch panel 144 coupled with processor 120 for receiving input from a user. In an embodiment, a touch panel comprises a touch sensitive layer coupled with the apparatus such as touch sensitive layer 285 of FIG. 2. In an embodiment, at least one touch panel 144 is at least one touch screen. In an embodiment, apparatus 160 further comprises at least one driver 140 implemented in hardware and/or software, which drives the one or more input and/or output devices, such as the at least one touch panel 144 and/or display 128.

In an example embodiment, the apparatus 160 further comprises a battery 134, such as a vibrating battery pack for powering various circuits to operate apparatus 160. In an embodiment, apparatus 160 further comprises volatile and/or non-volatile memory 138, such as random access memory (RAM). Memory 138 may comprise a cache area for the temporary storage of data. Further, in an embodiment, the apparatus 160 further comprises memory 138, which may be embedded and/or removable. The non-volatile memory 138 may also comprise an electrically erasable programmable read only memory (EEPROM), flash memory, and/or the like. In an embodiment, apparatus 160 may use memory to store any of a number of pieces of information and/or data to implement one or more features of the apparatus 160. Further, the memory may comprise an identifier, such as international mobile equipment identification (IMEI) code, capable of uniquely identifying the apparatus 160. The memory may store one or more instructions for determining cellular identification information based at least in part on the identifier. For example, the processor 120, using the stored instructions, may determine an identity, e.g., using cell identification information.

In an embodiment, processor 120 of apparatus 160 comprises circuitry for implementing one or more features of the apparatus. For example, the processor 120 may comprise at least one digital signal processor device, a microprocessor device, a digital to analog converter, other support circuits, and/or the like. Further, the processor 120 may comprise features to execute one or more software programs. For example, the processor 120 may be capable of operating a software program for connectivity, such as a conventional Internet browser. Further, the connectivity program may allow the apparatus 160 to transmit and receive Internet content, such as email messages, text messages, SMS messages, MMS messages, image data, video data, location-based content, web page content, and/or the like.

In an example embodiment, the apparatus 160 is capable of operating in accordance with any of a number of a first generation communication protocol, a second generation communication protocol, a third generation communication protocol, a fourth generation communication protocol, and/or the like. For example, the apparatus 160 may be capable of operating in accordance with second generation (2G) communication protocols IS-136, time division multiple access (TDMA), global system for mobile communication (GSM), IS-95 code division multiple access (CDMA), and/or the like. Further, the apparatus 160 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the apparatus 160 may also be capable of operating in accordance with 3.9 generation (3.9G) wireless communication protocols, such as Evolved Universal Terrestrial Radio Access Network (E-UTRAN) and/or the like, or wireless communication projects, such as long term evolution (LTE) and/or the like. Still further, the apparatus 160 may be capable of operating in accordance with fourth generation (4G) communication protocols.

In an embodiment, apparatus 160 is capable of operating in accordance with a non-cellular communication mechanism. For example, apparatus 160 may be capable of communication in a wireless local area network (WLAN), other communication networks, and/or the like. Further, the apparatus 160 may communicate in accordance with techniques, such as radio frequency (RF), infrared (IrDA), any of a number of WLAN techniques. For example, the apparatus 160 may communicate using one or more of the following WLAN techniques: IEEE 802.11, e.g., 802.11a, 802.11b, 802.11g, 802.11n, and/or the like.

While embodiments of the apparatus 160 are illustrated and will be hereinafter described for purposes of example, apparatus 160 may include other modules and/or capabilities including but not limited to an electronic device such as a portable digital assistant (PDA), a pager, a mobile television, a gaming device, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like.

FIG. 2 is a perspective view of an apparatus 260 comprising side 290, side 270, touch sensitive layer 285 and a display 265 according to an example embodiment of the invention. In an embodiment, the touch sensitive layer 285 is coupled with the apparatus 260. In an embodiment, the touch sensitive layer 285 has a portion 273, which opposes the side 290 and portion 275, which opposes side 270. In an embodiment, portions 273 and 275 comprise a single touch sensitive layer 285 disposed between sides 290 and 270. In another embodiment, portions 273 and 275 comprise two touch sensitive layers electrically coupled with each other using any method including but not limited to a wiring harness. In an embodiment, at least one of the sides 290 and 270 is at least partially flat. In an embodiment, the side 290 is substantially orthogonal to side 270.

In an embodiment, a side refers to any flat and/or curved, interior and/or exterior side, wall and/or surface of an apparatus. In an embodiment, a surface refers to any flat and/or curved, interior and/or exterior surface, wall and/or side of an apparatus.

In another embodiment, an apparatus such as apparatus 260 comprises touch sensitive layers 273 and 275 having at least one wiring pattern 295 and sides 290 and 270. In the embodiment, the touch sensitive layer 273 is coupled with touch sensitive layer 275. In the embodiment, touch sensitive layer 273 opposes side 290 and the touch sensitive layer 275 opposes the side 270.

In an embodiment, apparatus 260 comprises a display such as display 265 and the portion 273 at least partially opposes the display 265. Display 265 may be any type of display including but not limited to a liquid crystal display (LCD). A display may be flat and/or curved.

In an embodiment, touch sensitive layer 285 is electrically coupled with at least one device for driving the wiring pattern such as at least one driver 140 of FIG. 1. In another embodiment, touch sensitive layer 285 is electrically coupled with one device for driving the wiring pattern such as driver 140.

In an embodiment, a touch sensitive layer such as touch sensitive layer 285 is an electronic sensing device for detecting the presence and location of a touch signal. In an embodiment, a touch sensitive layer generally refers to a device for receiving a touch and/or proximity indication from a finger, hand, stylus and/or the like. In an embodiment, touch sensitive layer 285 is at least one of a touch panel and touch pad. In an embodiment, touch sensitive layer 285 and display 265 comprise a touch screen. In an embodiment, a touch screen comprises the touch sensitive layer and a display enabling a user to interact directly with what is displayed rather than indirectly with a cursor controlled by a mouse, for example.

In an embodiment, a touch sensitive layer such as touch sensitive layer 285 is an at least partially flexible, optically transparent, thin, film-like material comprising at least one conductive layer made from a material such as but not limited to indium tin oxide, fine line metal, Graphene and carbon nanotubes. In an embodiment, the touch sensitive layer 285 comprises at least one of indium tin oxide sensors, fine line metal sensors, Graphene sensors and carbon nanotube sensors. In an embodiment, at least one wiring pattern such as wiring pattern 295 comprising the material is disposed with the touch sensitive layer. In the embodiment, the wiring pattern is configured on the material to enable detection of a touch signal using any method including but not limited to capacitive sensing.

FIG. 3 is a perspective view of an apparatus 360 comprising side 370 and touch sensitive layer 375 according to an example embodiment of the invention. In an embodiment, apparatus 360 is apparatus 260 of FIG. 2. In an embodiment, side 397 of apparatus 360 is a side opposite to side 290 of FIG. 2. In an embodiment, side 370 is side 270 of FIG. 2.

FIG. 4 is a perspective view of an apparatus 460 comprising sides 490 and 470 and a touch sensitive layer 485 according to an example embodiment of the invention. In an embodiment, the touch sensitive layer 485 is coupled with the apparatus 460. In an embodiment, the touch sensitive layer 485 has a portion 473, which opposes the side 490 and a portion 475, which opposes the side 470. In an embodiment, portions 473 and 475 comprise a single touch sensitive layer 485 disposed between sides 490 and 470. In another embodiment, portions 473 and 475 comprise two touch sensitive layers electrically coupled with each other using any method including but not limited to a wiring harness. In an embodiment, at least one of the sides 490 and 470 is at least partially flat and/or curved. In an embodiment, the side 490 is substantially orthogonal to the side 470.

In an embodiment, apparatus 460 is apparatus 260 of FIG. 2, wherein side 470 is side 270 of FIG. 2 and side 490 is opposite to side 290 of FIG. 2. In the embodiment, side 290 of FIG. 2 may be considered a front side and side 490 may be considered a back side of apparatus 460. In the embodiment, the touch sensitive layer 485 is coupled with the apparatus 460. In the embodiment, the touch sensitive layer 485 has a portion 473, which opposes the side 490, a portion 475, which opposes the side 470 and a portion 273, which opposes side 290 of FIG. 2. In an embodiment, portions 473, 475 and 273 of FIG. 2 comprise a single touch sensitive layer 485 disposed among sides 490, 470 and 290 and FIG. 2. In another embodiment, portions 473, 475 and 273 of FIG. 2 comprise three touch sensitive layers electrically coupled with each other using any method including but not limited to a wiring harness. In an embodiment, at least one of the sides 490, 470 and 290 of FIG. 2 is at least partially flat and/or curved. In an embodiment, the sides 490 and 290 of FIG. 2 are substantially orthogonal to the side 470.

FIG. 5 is a side view of an apparatus 560 comprising sides 590, 570 and 591, a touch sensitive layer 585 and a display 565 according to an example embodiment of the invention. In an embodiment, the touch sensitive layer 585 is coupled with the apparatus 560. In an embodiment, the touch sensitive layer 585 has a portion 573, which opposes the side 590, a portion 575, which opposes the side 570 and a portion 586, which opposes side 591. In an embodiment, portions 573, 575 and 586 comprise a single touch sensitive layer 585 disposed among sides 590, 570 and 591. In another embodiment, portions 573, 575 and 586 comprise more than one touch sensitive layers electrically coupled with each other using any method including but not limited to a wiring harness. In an embodiment, at least one of the sides 590, 570 and 591 is at least partially flat and/or curved. In an embodiment, the sides 590 and 591 are substantially orthogonal to the side 570. In an embodiment, apparatus 560 is apparatus 460 of FIG. 4.

In an embodiment, apparatus 560 comprises a display such as display 565 and the portion 573 at least partially opposing the display 565. Display 565 may be any type of display including but not limited to a liquid crystal display (LCD).

In an embodiment, apparatus 560 comprises at least one cover 595 capable of covering at least a portion of at least one side such as sides 590, 570 and 591. In an embodiment, cover 595 protects at least one touch sensitive layer and/or display. In an embodiment, cover 595 prevents a touch sensitive layer from receiving a touch signal.

FIG. 6 is a side view of an apparatus 660 comprising sides 690, 670 and 691, a touch sensitive layer 685 and displays 665 and 666 according to an example embodiment of the invention. In an embodiment, the touch sensitive layer 685 and displays 665 and 666 are coupled with the apparatus 660. In an embodiment, the touch sensitive layer 685 has a portion 673, which opposes the side 690, a portion 675, which opposes the side 670 and a portion 686, which opposes side 691. In an embodiment, portions 673, 675 and 686 comprise a single touch sensitive layer 685 disposed among sides 690, 670 and 691. In another embodiment, portions 673, 675 and 686 comprise more than one touch sensitive layers electrically coupled with each other using any method including but not limited to a wiring harness. In an embodiment, at least one of the sides 690, 670 and 691 is at least partially flat and/or curved. In an embodiment, the sides 690 and 691 are substantially orthogonal to the side 670.

In an embodiment, apparatus 660 comprises portion 673 at least partially opposing the display 665 and portion 686 at least partially opposing display 666. Display 665 may be any type of display including but not limited to a liquid crystal display (LCD).

In an embodiment, apparatus 660 comprises at least one cover 695 capable of covering at least a portion of at least one side such as sides 690, 670 and 691. In an embodiment, cover 695 protects at least one touch sensitive layer and/or display. In an embodiment, cover 695 prevents a touch sensitive layer from receiving a touch signal.

FIG. 7 is a side view of an apparatus 760 comprising sides 790, 770 and 791, a touch sensitive layer 785 and transparent display 765 according to an example embodiment of the invention. In an embodiment, the touch sensitive layer 785 and display 765 are coupled with the apparatus 760. In an embodiment, the touch sensitive layer 785 has a portion 773, which opposes the side 790, a portion 775, which opposes the side 770 and a portion 786, which opposes side 791. In an embodiment, portions 773, 775 and 786 comprise a single touch sensitive layer 785 disposed among sides 790, 770 and 791. In another embodiment, portions 773, 775 and 786 comprise more than one touch sensitive layers electrically coupled with each other using any method including but not limited to a wiring harness. In an embodiment, at least one of the sides 790, 770 and 791 is at least partially flat. In an embodiment, the sides 790 and 791 are substantially orthogonal to the side 770.

In an embodiment, apparatus 760 comprises portions 773 and 786 at least partially opposing the transparent display 765. Display 765 may be any type of transparent display including but not limited to a liquid crystal display (LCD).

In an embodiment, apparatus 760 comprises at least one cover 795 capable of covering at least a portion of at least one side such as sides 790, 770 and 791. In an embodiment, cover 795 protects at least one touch sensitive layer and/or display. In an embodiment, cover 795 prevents a touch sensitive layer from receiving a touch signal.

FIG. 8 is a perspective view of an apparatus 860 comprising sides 890, 870 and 891, a touch sensitive layer 885 and displays 865 and 866 according to an example embodiment of the invention. In an embodiment, the touch sensitive layer 885 and displays 865 and 866 are coupled with the apparatus 860. In an embodiment, the touch sensitive layer 885 has a portion 873, which opposes the side 890, a portion 875, which opposes the side 870 and a portion 886, which opposes side 891. In an embodiment, portions 873, 875 and 886 comprise a single touch sensitive layer 885 disposed among sides 890, 870 and 891. In another embodiment, portions 873, 875 and 886 comprise more than one touch sensitive layers electrically coupled with each other using any method including but not limited to a wiring harness. In an embodiment, at least one of the sides 890, 870 and 891 is at least partially flat.

In an embodiment, apparatus 860 comprises portion 873 at least partially opposing display 865 and portion 886 at least partially opposing display 866. Display 865 may be any type of display including but not limited to a liquid crystal display (LCD), organic light emitting diode display (OLED) and/or the like. In an embodiment, display 865 is flexible. In an embodiment, apparatus 860 is flexible.

Figure 9:
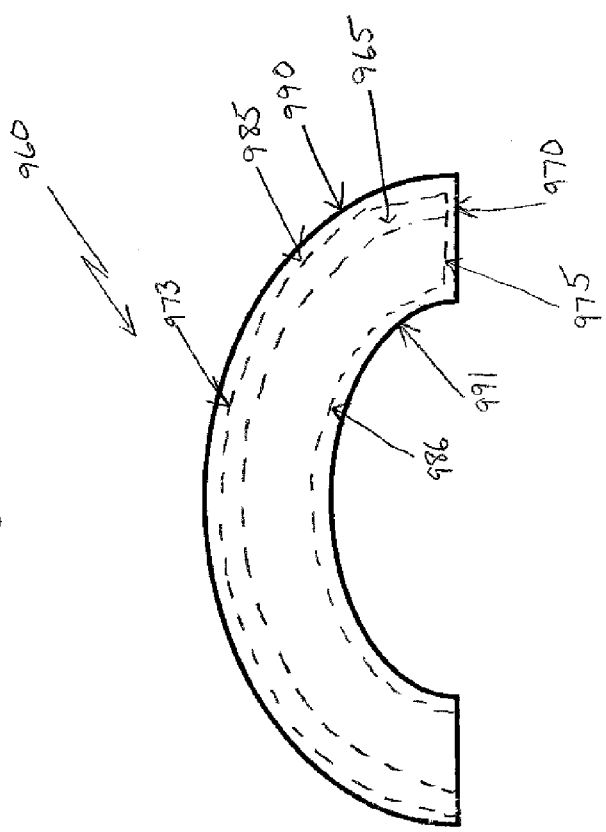
FIG. 9 is a side view of an apparatus comprising three sides, a touch sensitive layer and a display according to an example embodiment of the invention.

FIG. 9 is a side view of an apparatus 960 comprising sides 990, 970 and 991, a touch sensitive layer 985 and a display 965 according to an example embodiment of the invention. In an embodiment, the touch sensitive layer 985 is coupled with the apparatus 960. In an embodiment, the touch sensitive layer 985 has a portion 973, which opposes the side 990, a portion 975, which opposes the side 970 and a portion 986, which opposes side 991. In an embodiment, portions 973, 975 and 986 comprise a single touch sensitive layer 985 disposed among sides 990, 970 and 991. In another embodiment, portions 973, 975 and 986 comprise more than one touch sensitive layers electrically coupled with each other using any method including but not limited to a wiring harness. In an embodiment, at least one of the sides 990, 970 and 991 is at least partially flat and/or curved. In an embodiment, apparatus 960 is apparatus 560 of FIG. 5.

In an embodiment, apparatus 960 comprises a display such as display 965 and the portion 973 at least partially opposing the display 965. Display 965 may be any type of display including but not limited to a liquid crystal display (LCD), organic light emitting diode display (OLED) and/or the like. In an embodiment, display 965 is flexible. In an embodiment, apparatus 960 is flexible.

Figure 10:
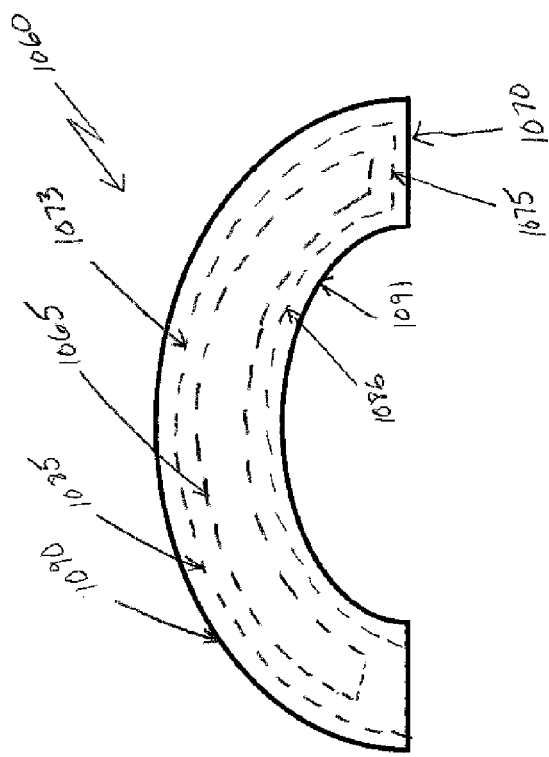
FIG. 10 is a side view of an apparatus comprising three sides, a touch sensitive layer and a transparent display according to an example embodiment of the invention.

FIG. 10 is a side view of an apparatus 1060 comprising sides 1090, 1070 and 1091, a touch sensitive layer 1085 and transparent display 1065 according to an example embodiment of the invention. In an embodiment, the touch sensitive layer 1085 and display 1065 are coupled with the apparatus 1060. In an embodiment, the touch sensitive layer 1085 has a portion 1073, which opposes the side 1090, a portion 1075, which opposes the side 1070 and a portion 1086, which opposes side 1091. In an embodiment, portions 1073, 1075 and 1086 comprise a single touch sensitive layer 1085 disposed among sides 1090, 1070 and 1091. In another embodiment, portions 1073, 1075 and 1086 comprise more than one touch sensitive layers electrically coupled with each other using any method including but not limited to a wiring harness. In an embodiment, at least one of the sides 1090, 1070 and 1091 is at least partially flat and/or curved. In an embodiment, the apparatus 1060 is flexible.

In an embodiment, apparatus 1060 comprises portions 1073 and 1086 at least partially opposing the transparent display 1065. Transparent display 1065 may be any type of display including but not limited to a liquid crystal display (LCD), organic light emitting diode display (OLED) and/or the like.

Figure 11:
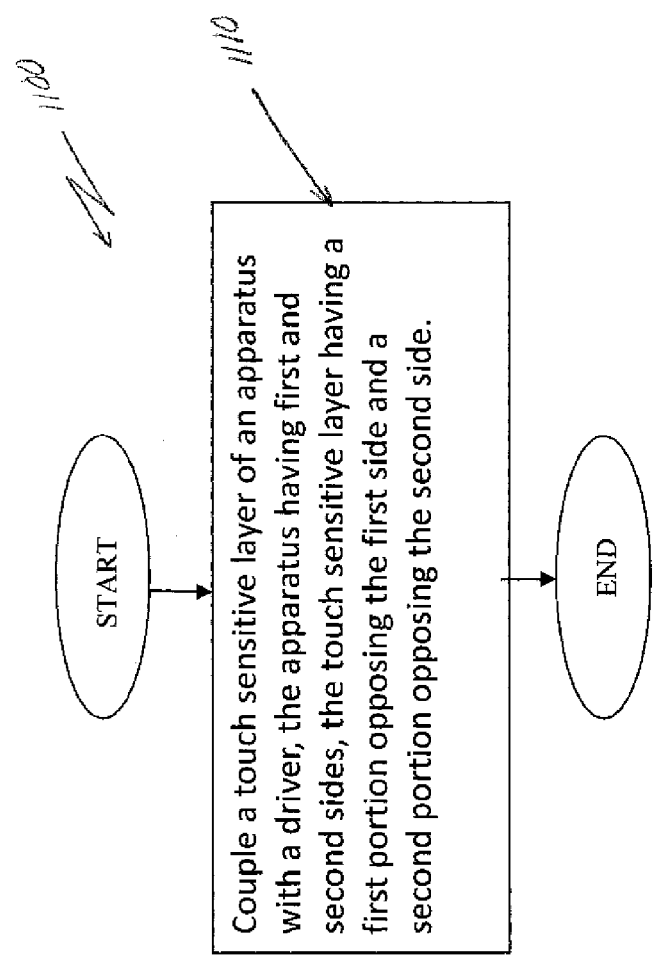
FIG. 11 is a flow diagram illustrating a method according to an example embodiment of the invention.

FIG. 11 is a flow diagram illustrating a method 1100 according to an example embodiment of the invention. In the embodiment, the method 1100 at 1110 comprises coupling a touch sensitive layer such as touch sensitive layer 285 of FIG. 2 of an apparatus such apparatus 260 with a driver such as driver 140 of FIG. 1. In the embodiment, the touch sensitive layer such as touch sensitive layer 285 of FIG. 2 has a first portion such as portion 273 opposing a first side of the apparatus such as side 290 and a second portion such as portion 275 opposing a second side of the apparatus such as side 270. In an embodiment, coupled the touch sensitive layer with a driver may be by any method including but not limited to using a wiring harness. The driver such as driver 140, which drives the touch sensitive layer may be implemented in hardware and/or software Without in any way limiting the scope, interpretation, or application of the claims appearing below, a technical effect of one or more of the example embodiments disclosed herein is to reduce cost by providing an apparatus comprising at least two sides and a touch sensitive layer coupled with a driver, wherein portions of the touch sensitive layer opposing the at least two sides of the apparatus are capable of receiving touch input.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    a housing including a first side, and a different second side;
    a driver located in said housing; and
    a touch sensitive layer connected to said driver, said touch sensitive layer comprising a wiring pattern for receiving a touch signal, said touch sensitive layer having a first portion opposing said first side and a second portion opposing said second side.

2. An apparatus according to claim 1, wherein said housing comprises a first display, and said first portion at least partially opposes said first display.

3. An apparatus according to claim 2, wherein said housing comprises a second display, and said second portion at least partially opposes said second display.

4. An apparatus according to claim 1, wherein said touch sensitive layer is at least partially flexible.

5. An apparatus according to claim 1, wherein at least one of said first and second sides is at least partially flat.

6. An apparatus according to claim 1, wherein at least one of said first and second sides is at least partially curved.

7. An apparatus according to claim 1, wherein said first side is substantially orthogonal to said second side.

8. An apparatus according to claim 1, wherein at least part of said touch sensitive layer is optically transparent.

9. An apparatus according to claim 1, wherein said touch sensitive layer comprises at least one of indium tin oxide sensors, Fine Line Metal sensors, Graphene sensors and carbon nanotube sensors.

10. An apparatus according to claim 1, where said apparatus is at least one of a communications device and computing device.

11. An apparatus according to claim 1, wherein said apparatus further comprises a third side and wherein said touch sensitive layer comprises a third portion opposing said third side.

12. An apparatus, comprising:
    a housing comprising a first side and a different second side;

first and second touch sensitive layers having at least one wiring pattern, said first touch sensitive layer coupled with said second touch sensitive layer; and a device for driving said at least one wiring pattern, said device being located in said housing, said second touch sensitive layer being coupled to said device, said first touch sensitive layer opposing said first side and said second touch sensitive layer opposing said second side.

13. An apparatus according to claim 12, wherein at least one of said first and second touch sensitive layers is substantially flexible.

14. An apparatus according to claim 12, wherein at least one of said first and second sides is at least partially flat.

15. An apparatus according to claim 12, wherein at least one of said first and second sides is at least partially curved.

16. An apparatus according to claim 12, wherein said first side is substantially orthogonal to said second side.

17. An apparatus according to claim 12, wherein at least part of at least one of said first and second touch sensitive layers is optically transparent.

18. An apparatus according to claim 12, where said apparatus is at least one of a communications device and computing device.

19. An apparatus according to claim 12, where said housing comprises a first display, and said first portion at least partially opposes said first display.

20. A method, comprising:

providing a housing of an apparatus, said housing including a first side and a different second side;

connecting a touch sensitive layer to said housing; and coupling said touch sensitive layer with a driver, where said driver is located in said housing, said touch sensitive layer having a first portion opposing said first side and a second portion opposing said different second side.

* * * * *